No. 856,256. PATENTED JUNE 11, 1907.
C. H. HERBERT.
ROPE HOLDER.
APPLICATION FILED NOV. 28, 1905.

Witnesses
W. H. Durand
Geo. E. Few

Inventor
Charles H. Herbert,
By Milo B. Stevens & Co.
Attorneys

UNITED STATES PATENT OFFICE.

CHARLES H. HERBERT, OF CHICAGO, ILLINOIS.

ROPE-HOLDER.

No. 856,256.　　　　　　Specification of Letters Patent.　　　　Patented June 11, 1907.

Application filed November 28, 1905. Serial No. 289,455.

*To all whom it may concern:*

Be it known that I, CHARLES H. HERBERT, a citizen of the United States, residing at Chicago, in the county of Cook and State of Illinois, have invented new and useful Improvements in Rope-Holders, of which the following is a specification.

This invention comprises a device adapted to be placed on a post, side of a building, or other fixed support, and is intended to hold the end of a clothes line, wire, or other rope, two or more of the devices being usually employed.

The device consists of two parts, a bracket which is attached to the stationary object and a swiveled or pivoted part or cam lever for clamping or holding the rope, which may be inserted and tightened in the clamp in a few seconds time.

Figure 1:
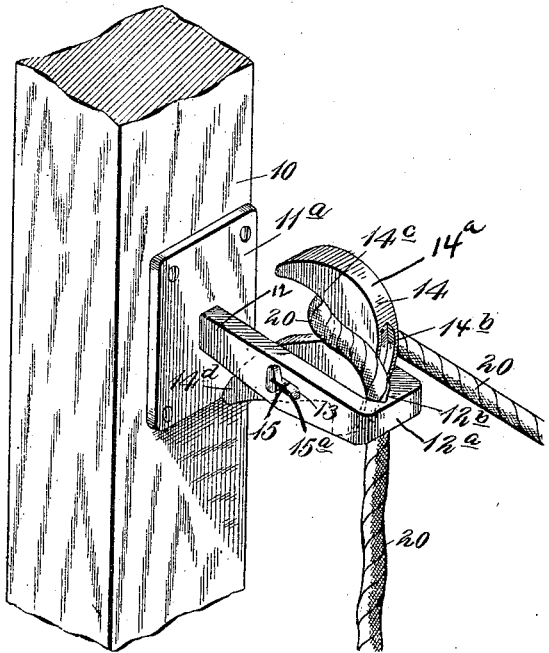
Figure 2:
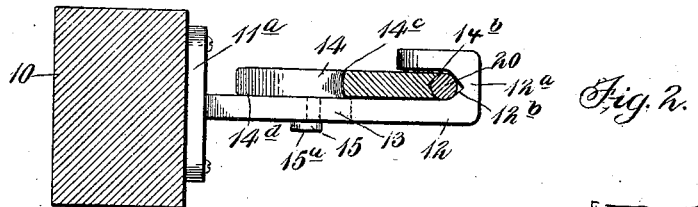
Figure 3:
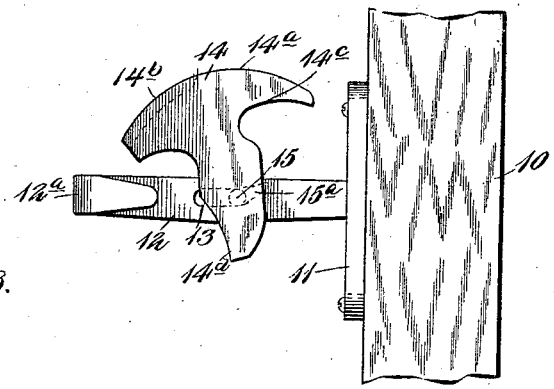

In the accompanying drawings, Figure 1 is a perspective view of the device showing a rope clamped in the same. Fig. 2 is a sectional plan. Fig. 3 is a side view showing the clamp tilted back and ready to receive the rope, and taken from the opposite side to that of Fig. 1.

Referring specifically to the drawings, 10 is a post, wall, or other support. Secured to this is a bracket having a plate $11^a$ having holes for screws or other means for attaching the plate to the support.

12 is an outwardly projecting supporting arm preferably integral with the plate $11^a$ and having a hook-shaped end $12^a$ which is adapted to surround the rope and keep the same in place against the cam lever 14. The arm 12 has a slot 13 into which the pintle or pivot pin 15 of the cam may be inserted, when in a suitable position. The hooked-shaped part $12^a$ of the arm 12 has on its inner side a V-shaped groove $12^b$ adapted to engage the rope when inserted in same (see Fig. 2). The cam 14 is a segmental plate or part having a pivotal bearing in the arm 12 of the bracket. This pivot pin 15 has a small lateral stud $15^a$ which prevents the segment 14 being removed from the bracket except when in a certain position. The rim $14^a$ of the segment has a groove $14^b$ preferably V-shaped.

$14^c$ is an upwardly and rearwardly projecting horn or hook formed at the back of the segment, and $14^d$ is a small arm at the lower end which may be used in loosening the clamp when engaging the rope tightly.

In the use of the device the cam 14 is turned up and back until its rim or clamping edge is distant from the hook $12^a$. The free end of the rope 20 is then inserted downwardly within the hook, the cam is then turned down to clamp the rope after which the part of the rope above the hook is then bent around the horn $14^c$, after which pull on either the free end of the rope or the standing part thereof will tighten the clamp.

I claim:

A rope holder comprising an attaching plate, a slotted arm projecting at an angle therefrom and having a hook at its outer end, and a cam connected by a sliding pivot in the slot to the side of the arm between the hook and the plate and adapted to swing in a plane parallel to the arm behind the hook and to clamp a rope in said hook, said cam having an upwardly and rearwardly extending horn at its front end, projecting above the arm.

In testimony whereof I have signed my name to this specification in the presence of two subscribing witnesses.

CHARLES H. HERBERT.

Witnesses:
 NELLIE FELTSKOG,
 H. G. BATCHELOR.